UNITED STATES PATENT OFFICE.

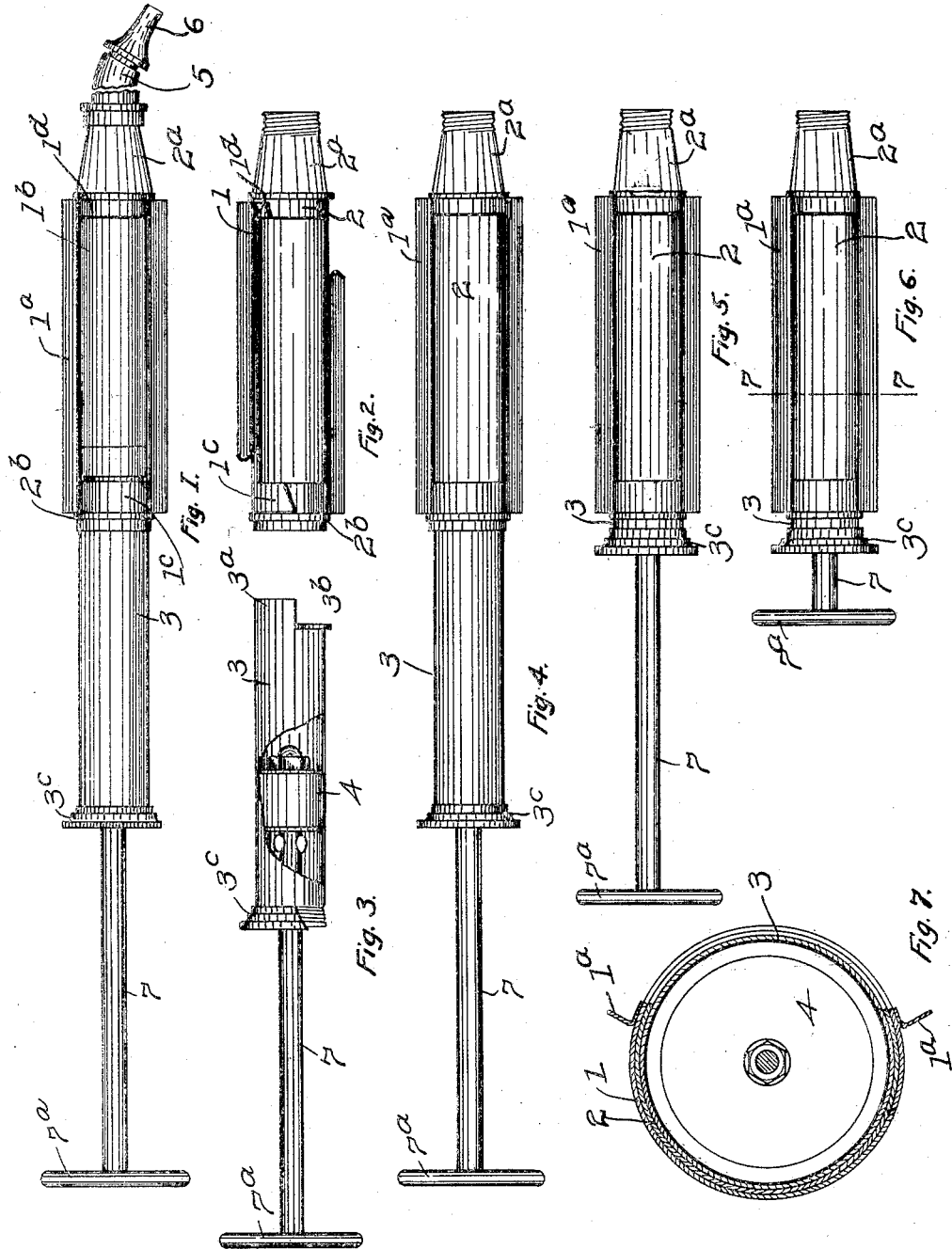

EDWARD R. HENTIG, OF SAN DIEGO, CALIFORNIA.

GREASE-GUN.

1,329,662.  Specification of Letters Patent.  Patented Feb. 3, 1920.

Application filed August 11, 1919. Serial No. 316,536.

*To all whom it may concern:*

Be it known that I, EDWARD R. HENTIG, a citizen of the United States, residing at San Diego, in the county of San Diego and State of California, have invented certain new and useful Improvements in Grease-Guns, of which the following is a specification.

My invention relates to grease guns for injecting grease through holes to the working parts of machinery and the objects of my invention are: first, to provide a grease gun of this class which may be quickly filled at one side, then the side closed and the grease forced to the position desired; second, to provide a grease gun of this class with a detachable nozzle so that a variety of different sized exits for the grease are provided; third, to provide a grease gun of this class in which all the parts are readily accessible for cleaning and for changing of the grease; fourth, to provide a grease gun of this class which will hold approximately twice the quantity of grease that the conventional grease gun will hold proportionate to its size and length in collapsed form and fifth, to provide a grease gun of this class which is very simple and economical of construction, durable, easy to operate, efficient in its action and which will not readily deteriorate or get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this application, in which:

Figure 1 is a side elevational view of my grease gun in its assembled form showing the parts extended and ready for filling; Fig. 2 is a fragmentary side elevational view of the main stationary member and revoluble member 2 with a portion of the nozzle removed and showing a portion broken away to facilitate the illustration; Fig. 3 is a side elevational view of one of the movable members and the plunger showing portions broken away to facilitate the illustration; Fig. 4 is a side elevational view of the gun with the grease intake portion closed and ready to force the grease into position; Fig. 5 is a similar view showing the barrel portion moved inwardly in the main portion and a portion of the grease forced out through the entrance; Fig. 6 is a similar view showing the gun in its collapsed position with all of the grease removed and Fig. 7 is a sectional view through 7—7 of Fig. 6 on an enlarged scale.

Similar characters of reference refer to similar parts and portions throughout the several views of the drawings.

The main outer member 1, revoluble intermediate member 2, cylindrical reciprocating member 3, plunger 4, nozzle member 5, nozzle member 6 and plunger rod 7 constitute the principal parts and portions of my grease gun.

The outer member 1 is cylindrical in form and provided with longitudinal lugs $1^a$ on opposite sides and provided with a cutaway portion $1^b$ extending nearly one-half its circumference and extending nearly its full length leaving complete cylindrical ends $1^c$ and $1^d$. It will be noted that the lugs $1^a$ are for the purpose of hand holds which may be eliminated and the member knurled if desired. Revolubly mounted on this member 1 is another member similar to the member 2 with a cut-away portion in one side conforming to the cut-away portion in the member 1 when it is turned to a certain position relatively thereto. It is provided with a reducing end $2^a$ threaded externally forming a reduced exit for the grease and adapted for the nozzle 5 to be screwed thereon. At its opposite end it is provided with an enlarged shoulder portion $2^b$ to prevent longitudinal movement of the member 2 relatively to the member 1 but permits revoluble movement. Reciprocally mounted in the interior of the member 2 is a cylindrical member 3, the one-half of one end being extended at $3^a$ and the short portion is provided with a semi-circular outwardly flanged portion $3^b$ the edges of which are adapted to engage the edges of the member 2 when said member 3 is turned in either direction for turning the member 2 in the member 1. The other end of the member 3 is provided with a cap $3^c$ which is provided with a central hole adapted for the plunger rod 7 to reciprocate therein. Reciprocally mounted in this member 3 is a plunger member 4 to which is secured the plunger rod 7 which is provided with a handle 7ª on its outer end. It will be noted that the nozzle of the grease gun is made in three portions 2ª, 5 and 6. The portion 6 is reduced in size and is adapted to be inserted into the small end of the member 5, the member 5 is screwed on to the small end of the portion 2ª of the member 2 so that if it is desired to deliver the grease into a small hole all three of the members are used; if it is desired to deliver the grease to a larger hole the member 6 is removed; if it is desired to deliver the grease to a still larger hole the members 5 and 6 are both removed as shown in Figs. 2, 4, 5 and 6 of the drawings.

The operation of the grease gun is as follows: The operator holds the member 1 and with his hand grasps the handle 7ª, pulls the plunger 4 and member 3 in extended positions relative to the other members and to each other as shown best in Fig. 1 of the drawings. The grease is then inserted into the opening 1ᵇ in the members 1 and 2 and up into the cylinder member 3, filling said cylinder member 3 after which the member 3 is turned one-half revolution carrying with it the member 2 by means of the flange 3ᵇ engaging the edges of the opening in said member 2, the member 1 being held from turning by grasping the flanges 1ª, then the nozzle is inserted in the position desired and the member 3 is forced inwardly to the position shown in Fig. 5 of the drawings, the operation of which forces a portion of the grease out through the nozzle, then the plunger 4 is moved inwardly to the position shown in Fig. 6 of the drawings forcing the remainder of the grease to the position desired, after which the parts are again extended as hereinbefore described and ready to be filled.

Though I have shown and described a particular construction, combination and arrangement of parts and portions I do not wish to be limited to this particular construction, combination and arrangement but desire to include in the purview of my invention the construction, combination and arrangement substantially as set forth in the appended claims.

Having thus described my invention what I claim as new and desire to secure by Letters Patent, is:

1. In a grease gun, the combination of a main cylindrical casing member provided with an aperture in the one side thereof, another cylindrical member revolubly mounted therein provided with a conforming aperture therein, a cylinder reciprocably mounted in said revoluble member provided with a lug in one side adapted to engage said revoluble member for turning the same in said main casing and a plunger reciprocably mounted in said reciprocating cylinder.

2. In a grease gun, the combination of a main cylindrical casing member provided with an aperture in the one side thereof, another cylindrical member revolubly mounted therein provided with a conforming aperture therein, a cylinder reciprocably mounted in said revoluble member provided with a lug in one side adapted to engage said revoluble member for turning the same in said main casing, a plunger reciprocably mounted in said reciprocating cylinder and a plurality of reducing nozzles adapted to be secured on the extended end of said revoluble member.

3. In a grease gun, a main outer casing member provided with an inlet aperture in the one side thereof, a revoluble member provided with an inlet aperture in one side thereof revolubly mounted therein, a reciprocating cylindrical member provided with a lug on one end adapted to extend into the aperture in said revoluble member and engage the edges thereof for revolving the same when said cylindrical member is revolved and a plunger reciprocably mounted in said reciprocating cylindrical member.

In testimony whereof, I have hereunto set my hand at San Diego, California this 4th day of August 1919.

EDWARD R. HENTIG.